United States Patent [19]

Kim et al.

[11] Patent Number: 4,645,595
[45] Date of Patent: Feb. 24, 1987

[54] WATER SOFTENING SYSTEM PARTICULARLY FOR INDIVIDUAL APPLIANCES

[75] Inventors: Bang M. Kim; Fred F. Holub, both of Schenectady, N.Y.

[73] Assignee: General Electric Company, Schenectady, N.Y.

[21] Appl. No.: 674,114

[22] Filed: Nov. 23, 1984

[51] Int. Cl.[4] .............................................. B01J 47/00
[52] U.S. Cl. .................................. 210/181; 210/190; 210/282
[58] Field of Search ............... 210/673, 687, 190, 191, 210/269, 278, 282, 181

[56] References Cited

U.S. PATENT DOCUMENTS 2,855,364  10/1958  Roberts ................................ 210/275
3,719,594   3/1973  Borochaner .......................... 210/190
4,184,948   1/1980  Dabby et al. ......................... 210/673

OTHER PUBLICATIONS

Kirk-Othmer, "Water (Municipal)", *Encyclopedia of Chemical Technology*, 2nd Ed., vol. 21, John Wiley & Son, 1970, pp. 693-694.
B. M. Kim, "Continuous Ion Exchange Process Using Thermally Regenerable Liquid Ion Exchangers", Patent Application Ser. No. 557,986 filed Dec. 5, 1983.
Kirk-Othmer, "Water (Municipal)", *Encyclopedia of Chemical Technology*, 2nd Ed., vol. 22, John Wiley & Son, 1970, pp. 97-103.
M. B. Jackson, "Methods of Preparation of Thermally Regenerable Ion Exchange Resins", *Am. Chem. Soc. Div. Polym. Chem. Prepr.* vol. 20, No. 1, 1979, pp. 624-627.
T-B Hsu & R. L. Pigford, "Properties of the Amphoretic, Thermally Regenerable Ion-Exchange Resins Amberlite XD-2 and Amberlite XD-5", *Ind. Chem. Pros. Res. Dev.*, vol. 20, No. 2, 1981, pp. 361-365.
G. R. Ackerman et al., "Industrial Deionization with Amberlite® XD-2-A Thermally Regenerable Ion Exchange Resin", *AIChE Symposium Series*, vol. 73, No. 166, 1976, pp. 107-111.

*Primary Examiner*—Ivars Cintins
*Attorney, Agent, or Firm*—Lawrence D. Cutter; James C. Davis, Jr.; Marvin Snyder

[57] ABSTRACT

A thermally regenerable ion exchange material is employed in a disposable cartridge preferably contained within an appliance such as a clothes washer or dishwasher. A hot water source is employed to regenerate the ion exchange material or to be mixed with cold water passed through the treatment cartridge. Additionally, in those situations requiring a high degree of deionization, hot water is used in conjunction with a heat exchanger to heat processed water rather than being mixed with it so as to produce fully de-ionized hot water.

5 Claims, 4 Drawing Figures

WATER SOFTENING SYSTEM PARTICULARLY FOR INDIVIDUAL APPLIANCES

BACKGROUND OF THE INVENTION

The present invention is related to water softening systems for dishwasher, laundry and other appliances so as to economically produce superior water quality and to require less detergent for cleaning. More particularly, the present system is related to laundry, dishwasher and other appliances incorporating thermally regenerable ion exchange materials in cartridges which are easily mounted and exchanged as needed so as to provide a built-in water softening funcion.

At present, dishwasher and laundry appliance units do not include built in water softening devices. Instead, large, central chemically activated water softening units are employed. These units soften all water which is used throughout the home or business. This can be needlessly expensive since water which does not need softening is nonetheless treated.

However, water hardness principally due to concentrations of divalent species such as calcium and magnesium cause undesirable problems. In particular, the presence of such materials, particularly at concentrations greater than about 120 parts per million cause soap to be wasted, cause spotting in dishwashers and also cause scale formation in pipes. Systems which treat these hard water problems typically do so through the addition of chemicals to regenerate conventional water softening resins and the like. This is inconvenient and expensive and additionally, unnecessarily adds salt concentrations to the wastewater.

Accordingly, it is desirable to provide deionized water, that is softened water, only to those appliances for which hard water is a particular problem. It is also seen that it is desirable to employ a water softening system which is easy to operate and maintain and which may in fact be operable through conventional automatic timed cycle fluid valve operation such as that conventionally found on dishwashers and fabric washing units. It is also seen that it is desirable to employ a water softening system in which the degree of deionization is controllable.

SUMMARY OF THE INVENTION

In accordance with a preferred embodiment of the present invention, a water system comprises a thermally regenerable ion exchange material disposed in a removable flow through cannister. Valve and conduit means are provided to direct cold water from a cold water source through the ion exchange material. Valve and conduit means are also employed to mix hot water from a hot water source with cold water from the output of the cannister. Valve and conduit means are also provided to flush hot water through the ion exchange material so as to periodically regenerate it. In an alternate embodiment of the present invention, a heat exchanger may be provided for receiving hot water from a hot water source and also for receiving water treated in the cannister so as to provide hot water with a high degree of deionization. The system of the present invention is preferably included in a water consuming appliance which houses the system. Such appliances typically include conventional home fabric washing and dishwashing machines. However, the system of the present invention is also readily incorporated in other appropriate commercial systems.

Accordingly, it is an object of the present invention to provide a water softening system which is employable in individual water consuming appliances.

It is also an object of the present invention to provide a water softening system for small appliances which is easily maintained and which incorporates a disposable cartridge containing thermally regenerable ion exchange material.

It is yet another object of the present invention to provide water softening capabilities only in those appliances which are most directly affected by hard water conditions.

Lastly, but not limited hereto, it is an object of the present invention to provide a water softening system which does not require the use of chemical additives and results in the reduction of chemical cost and simplifies the operation of the water softening process.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
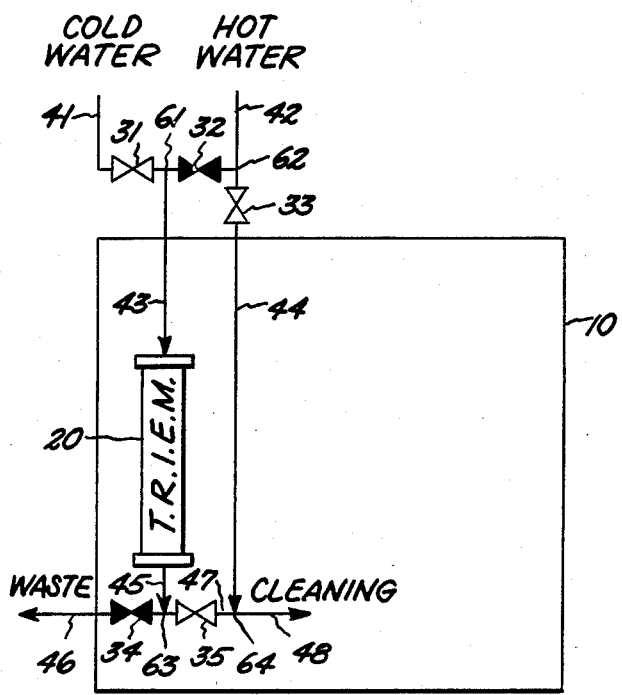
FIG. 1 is a schematic illustration of the system of the present invention illustrating conventional operation in a water consuming appliance.

A preferred embodiment of the present invention is illustrated schematically in FIG. 1. In this figure, thermally regenerable ion exchange material (T.R.I.E.M.) is shown disposed in cannister 20 as part of appliance 10. Appliance 10 typically comprises a clothes or dishwashing machine or other soap and water consuming apparatus including shower stalls, particularly the self-standing variety. In this regard, FIG. 1 illustrates the valving arrangement for conventional (non-regenerating) operation. In particular, valves 31, 33, and 35 are shown in their fully opened positions. In contrast, valves 32 and 34 are shown in their fully closed positions. In this configuration, cold water flows through conduit 41, valve 31, and conduit 43 and thence through cartridge or cannister 20. The cartridge or cannister contains thermally regenerable ion exchange material which acts to deionize cold water flowing through the cannister. Treated water from the cannister flows through conduit 45 and valve 35 and is mixed with hot water at T-joint 64. Thus, treated water flowing through conduit 45, valve 35, and conduit 47 is mixed with untreated hot water which flows through conduit 42, T intersection 62, open valve 33 and conduit 44. This results in a flow of warm partially-deionized water in conduit 48. It is this treated and processed liquid stream which is employed in appliance 10 to perform the desired cleaning function. If cold water is acceptable, for example, in certain fabric cycles, valve 33 may also be either wholly or partially closed. Valve 33 being fully closed provides the advantage that all of the cleaning water has been subject to the deionization treatment in cartridge 20. It is noted that while valves 31, 32, and 33 in FIG. 1 are shown disposed exterior to appliance 10, that it is also possible to employ these valves within the appliance. In particular, it is also noted that these valves may be employed as part of the conventional automated valving system for the various cycles in the appliance. It is also noted that while the schematic diagrams suggests that the valves are either fully open or fully closed, that it is also possible to employ solenoidally controlled valves which exhibit continuously variable positioning.

Figure 2:
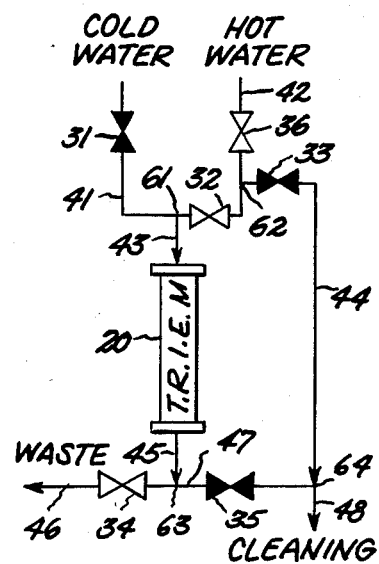
FIG. 2 is a schematic diagram similar to FIG. 1 but more particularly showing the valving arrangement employed in the thermal regeneration mode of operation.

FIG. 2 illustrates the regneration mode of operation of the present invention. In particular, valve 31 is closed so as to shut off the flow of cold water through cartridge 20. Likewise, valves 33 and 35 are shut to shut off the supply of hot water to the appliance. However, optional valve 36 in conduit 42 permits the flow of hot water through T-intersection 62 to valve 32 through T-intersection 61 and thus through conduit 43 to cartridge 20. The flow of hot water through the thermally regenerable ion exchange material in cartridge 20 causes a regeneration of the material. This regeneration occurs without removing the material from the appliance and without the addition of any chemicals to the cartridge or to the water streams. Hot water used to regenerate the deionizing material then flow through valve 45, T intersection 63, and open valve 34 to waste conduit 46. It is thus seen that a simple valving control operation is employable to regenerate the deionizing material.

Figure 3:
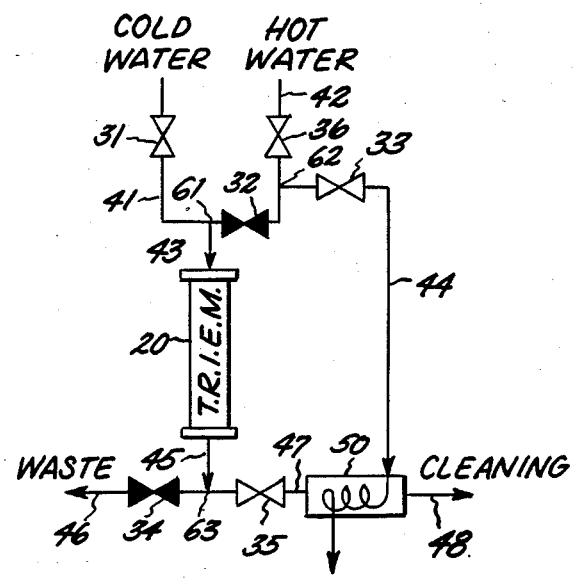
FIG. 3 is a schematic diagram of the present invention more particularly illustrating an embodiment thereof in which maximum deionization is provided particularly through the use of a heat exchange mechanism.

In yet another embodiment of the present invention, the system of FIG. 1 or 2 may be provided with heat exchanger 50. This configuration is particularly useful for those situations in which a fully deionized stream of warm or hot water is desired. In particular, this configuration is shown in FIG. 3. Conduit 44 carrying hot water is connected to the water jacket portion of heat exchanger 50. The cold water output from cartridge 20 flows through conduit 45, open valve 35, and conduit 47 to heat exchanger 50 in which the fully deionized water stream is heated. In this configuration, a heat exchanger is employed rather than the mixing that occurs at T-intersection 64 as is seen in FIG. 1. In the configuration of FIG. 3, all of the water that passes through conduit 48 to the cleaning cycle is water that is processed through cannister 20. Water flowing through conduit 44 and heat exchanger 50 may be recycled to the cold water source if desired.

Figure 4:
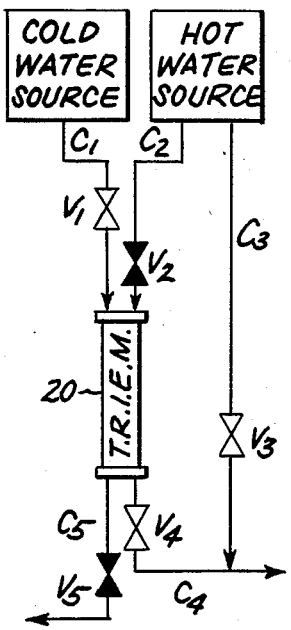
FIG. 4 illustrates a more conceptual embodiment of the present invention and particularly illustrates valving arrangements for conventional operation.

FIG. 4 illustrates a more conceptual embodiment of the present invention shown in the conventional mode of operation in which cold water is directed through conduit $C_1$, valve $V_1$, to the thermally regenerable ion exchange material and thus through valve $V_4$ and conduit $C_4$ where it is mixed with hot water from conduit $C_3$ flowing through valve $V_3$. In this mode of operation, valves $V_2$ and $V_5$ are closed. In the regeneration mode of operation, valves $V_1$, $V_3$ and $V_4$ are closed and valves $V_2$ and $V_5$ are open so that hot water flows through conduit $C_2$, the ion exchange material and conduit $C_5$.

In the present invention, thermally regenerable ion exchange material is preferably disposed is a disposable plastic cartridge so as to be easily mounted and changed. The plastic material should have a heat distortion temperature sufficient to withstand the temperatures associated with the hot water source. Typically, a heat distortion temperature in excess of 300° F. is sufficient for most non-commercial applications of the present invention. Cartridge 20 is filled with thermally regenerable ion exchange material or heat-activated ion exchange material. For example, Amberlite TM XD-2 and XD-5 are thermally regenerable ion exchange materials which are applicable to the present invention. These materials are manufactured by the Rohm and Haas Company, Philadelphia, Pa. The properties of these materials are described by T-B Hsu and R. L. Pigford, (T-B Hsu and R. L. Pigford, Properties of the Amphoteric, Thermally Regenerable Ion-Exchange Resin Amberlite XD-2 and Amberlite XD-5, Ind. Chem. Prod. Res. Dev. Vol. 20, No. 2, p. 361–365, 1981). Methods of preparing thermally regenerable ion exchange resins are described by Jackson. (M. B. Jackson, Methods of Preparation of Thermally Regenerable Ion Exchange Resins, Am. Chem. Soc. Div. Poly. Chem. Prepr. Vol. 20, No. 1, p.624–7, 1979). These thermally regenerable materials may be maintained in place within cartridge 20 by means of support screens.

When only moderate temperature and moderate ion exchange treatment is desired (70 to 80 percent deionization), the system operating as shown in FIG. 1 is employed. Cold water passes through the ion exchange resin and is then mixed with non-softened hot water in proportions resulting in the proper temperature. If a more deionized system is desired, a heat exchanger may be employed as shown in FIG. 3 to heat the deionized water so that all of the warm water supplied to the system is deionized to the fullest capabilities of the system. Regeneration operations, such as that shown in FIG. 2 typically require hot water at a temperature of about 80° C. After regeneration, the salt-containing hot water is directed to the exterior waste system. It is also noted that valves $V_3$ and $V_4$ could be replaced by a single valve downstream of the juncture of conduits $C_3$ and $C_4$.

From the above, it is seen that the apparatus of the present invention provides self-standing water softening appliances such as dishwashers and clothes washing machines and bathroom/shower systems. It is also seen that the present invention provides a system in which deionized water is provided only to those appliances which are most appropriate. It is also seen that the system of the present invention is readily maintainable by a consumer and which may be incorporated into the normal automatic cycling of the system equipment. One of the embodiments of the present invention also provides, at the user's option, a choice of a fully deionized cleaning water stream or a partially deionized but hotter water stream.

While the invention has been described in detail herein in accordance with certain preferred embodiment thereof, many modifications and changes therein may be effected by those skilled in the art. Accordingly, it is intended by the appended claims to cover all such modifications and changes as fall within the true spirit and scope of the invention.

The invention claimed is:

1. A water softening system comprising:

a thermally regenerable ion exchange material disposed in a removable, flow-through cannister;

first valve and conduit means operable to direct cold water from a cold water source through said ion exchange material;

second valve and conduit means operable to mix hot water from a hot water source with cold water treated within said cannister, whereby a flow of warm, deionized water is producable; and third valve and conduit means operable to flush hot water through said thermally regenerable ion exchange material, whereby said ion exchange material is regenerated.

2. The system of claim 1 further including a water consuming apparatus which houses said system, said system being operable to supply said apparatus with water from said mixed flow.

3. A water softening system comprising:

a thermally regenerable ion exchange material disposed in a removable, flow-through cannister;

first valve and conduit means operable to direct cold water from a cold water source through said ion exchange material;

a heat exchanger for receiving water from a hot water source and water from a cold water source for heating said cold water, said cold water source for said heat exchanger input being the treated flow from said cannister;

second valve and conduit means operable to flush hot water through said thermally regenerable ion exchange material, whereby said ion exchange material may be regenerated.

4. The system of claim 3 further including a water consuming apparatus which houses said system, said system being operable to supply said apparatus with water from the flow from said cannister and which passes through said heat exchanger.

5. A water softening system comprising:

a hot water source;

a cold water source;

a thermally regenerable ion exchange material disposed in a removable, flow-through cannister;

first conduit means connecting said cold water source to the input side of said cannister;

first valve means to control the flow of cold water to the input side of said cannister;

second conduit means connecting said hot water source to said cannister;

second valve means to control the flow of hot water to said cannister;

third conduit means connected to said hot water source;

third valve means to control the flow of hot water in said third conduit means;

fourth conduit means connecting said cannister to said third conduit at a point in said third conduit means downstream of said third valve means;

fourth valve means in said fourth conduit means to control the flow of treated water from said cannister;

fifth conduit means connected to the output side of said cannister;

fifth valve means in said fifth conduit means to control the flow of water from said cannister;

whereby said first, fourth, and third valve means operate in an open position to produce a mixture of hot water and treated cold water with said second and fifth valve means closed and whereby said second and fifth valve means operate in an open position to regenerate said ion exchange material with said first and fourth valve means closed.

* * * * *